US006882620B1

(12) United States Patent
MacLellan et al.

(10) Patent No.: US 6,882,620 B1
(45) Date of Patent: Apr. 19, 2005

(54) TOKEN EXCHANGE SYSTEM WITH FAULT PROTECTION

(75) Inventors: Christopher S. MacLellan, Norwood, MA (US); John K. Walton, Hopedale, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/085,592

(22) Filed: May 27, 1998

(51) Int. Cl.[7] .................. G01R 31/08; G06F 11/00; G08C 15/00
(52) U.S. Cl. ............... 370/217; 370/450; 709/251; 714/724
(58) Field of Search ............... 370/216, 217, 370/221, 222, 225, 226, 257, 258, 242, 244, 449, 450, 451; 704/251, 252, 203; 714/724, 725, 726, 733

(56) References Cited

U.S. PATENT DOCUMENTS

| | | | | |
|---|---|---|---|---|
| 4,731,880 A | * | 3/1988 | Ault et al. | 359/120 |
| 5,239,673 A | * | 8/1993 | Natarajan | 455/426 |
| 5,444,695 A | * | 8/1995 | Copley et al. | 370/452 |
| 5,710,777 A | * | 1/1998 | Gawne | 370/222 |
| 5,841,790 A | * | 11/1998 | Salem et al. | 714/724 |
| 5,844,917 A | * | 12/1998 | Salem et al. | 714/724 |
| 5,852,747 A | * | 12/1998 | Bennett et al. | 710/40 |
| 5,890,001 A | * | 3/1999 | Hall | 710/240 |
| 6,026,078 A | * | 2/2000 | Smith | 370/258 |
| 6,035,340 A | * | 3/2000 | Fischer et al. | 709/249 |
| 6,160,547 A | * | 12/2000 | Roth | 345/328 |

* cited by examiner

Primary Examiner—Bob A. Phunkulh
(74) Attorney, Agent, or Firm—Wolf, Greenfield & Sack, P.C.

(57) ABSTRACT

According to one embodiment, a system for controlling passing of a token among a plurality of clients that access a shared resource includes at least one controller. The at least one controller is configured to cause the token to be passed to each of the plurality of clients when the system is in a first state, and to cause the token to be passed to fewer than all of the plurality of clients when the system is in a second state. According to another embodiment, a token-ring system includes a shared resource, at least first and second clients that access the shared resource, and error detection logic. The first client includes a primary device and a secondary device which provides bootstrap information to the primary device. The error detection is configured to directly monitor the secondary device for an anomaly in the operation thereof. According to yet another embodiment, a method is disclosed for operating a multi-port memory including at least first and second memory ports that access a shared memory. The first memory port includes a primary device and a secondary device which provides bootstrap information to the primary device. The method includes steps of: (a) permitting each of the first and second memory ports to access the memory when it is in possession of a token, and (b) continuously monitoring the secondary device for an anomaly in operation thereof.

55 Claims, 5 Drawing Sheets

TOKEN EXCHANGE SYSTEM WITH FAULT PROTECTION

BACKGROUND OF THE INVENTION

1. Field of the Invention

The present invention is directed to electronic systems that employ token-passing to control access to shared resources and, more particularly, to fault protection schemes for such systems.

2. Discussion of Related Art

In electronic systems, it is common for two or more pieces of equipment (e.g., "clients") to access to a single shared resource. For example, in multi-port memories, two or more ports access a single random-access memory (RAM) array to write data thereto or to read data therefrom. Because, in many situations, a shared resource can be used by only one client at a time, it is generally undesirable for two clients to be permitted to access the shared resource simultaneously. Various schemes therefore have been developed to control access to shared resources (e.g., memory arrays) by groups of clients (e.g., memory ports) so that only one client can access the resource at a time.

One of these schemes is called a "token ring." A token ring is group of clients that are interconnected to pass a virtual token among them in a ring-like fashion, with each client being permitted to access a resource shared by all of the clients in the group only when it is in possession of the token. A token may be, for example, a single bit or several bits that can be passed from one client to another in the token ring.

Figure 1:
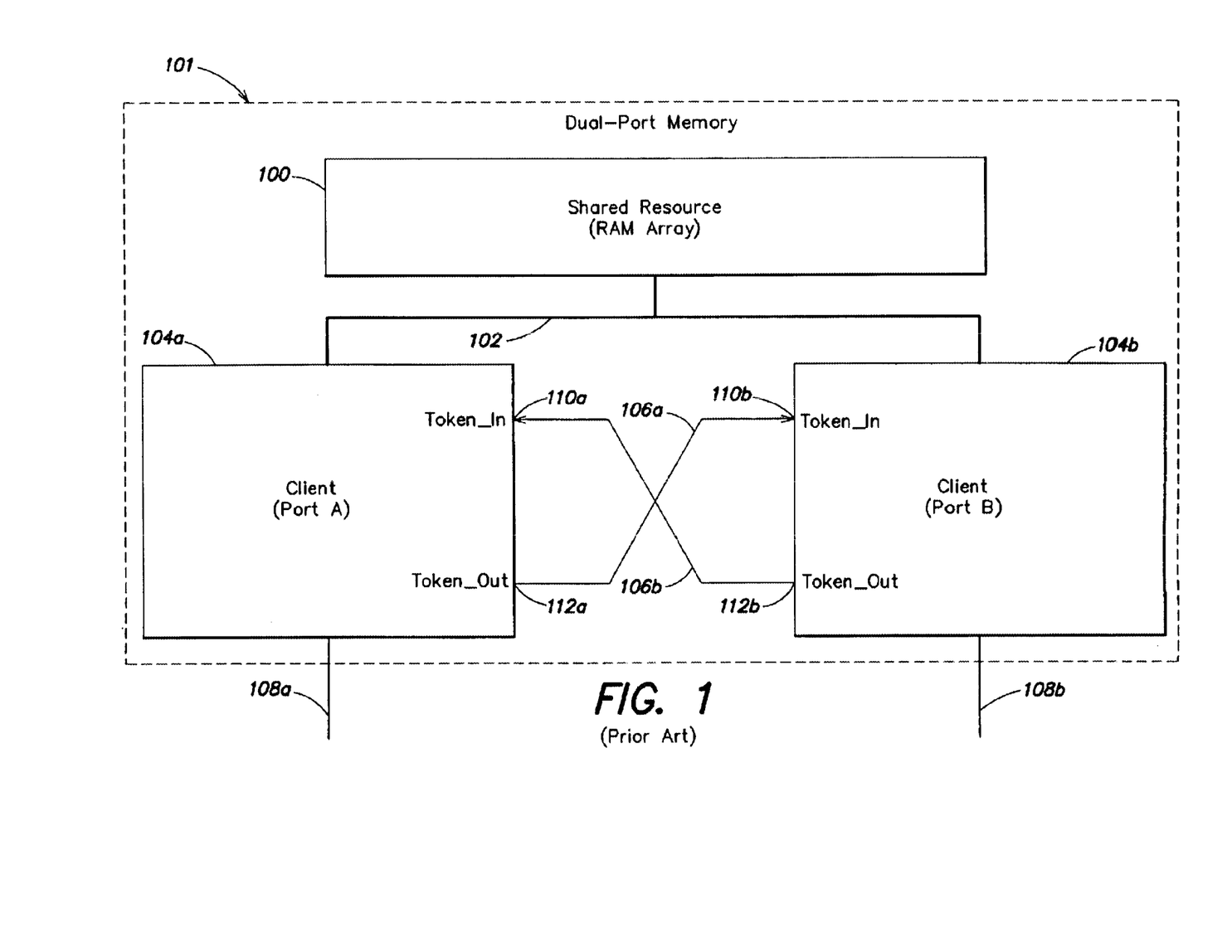
FIG. 1 is block diagram showing a prior art shared-resource system employing a token ring.

An example of a prior art token-passing scheme, as applied to a dual-port memory 101 (i.e., a memory having two independently accessible ports), is shown in FIG. 1. As shown, shared resource 100 (a RAM array) is shared by a first client 104a (Port A) and a second client 104b (Port B). The clients 104a and 104b are able to access the shared resource 100 via a single, shared bus 102. The bus 102 includes data lines and control lines to exchange data and control information, respectively, between the clients 104a and 104b and the shared resource 100.

The clients 104a and 104b also are connected, respectively, to system interface busses 108a and 108b which, in the example shown, provide paths for data to be written from an external system component (not shown) to the dual-port memory 101. Each of the clients 104 may include write buffers (not shown) that store data written from the external system component prior to the data being written by the client to the shared resource 100. Similarly, each of the clients 104 may include read buffers (not shown) that store data read from shared resource 100 and make the stored data available to the external system component. These read and write buffers may be implemented using first-in-first-out buffers (FIFOs) so that data may be transferred to and from the buffers asynchronously. Additionally, selectively enablable drivers (not shown) may be included in each of the clients 104 to provide an interface to the bus 102. By selectively enabling only a particular client's drivers, that client may be given exclusive control of the bus 102.

Once the external system component (not shown) has written data to a write buffer in the client 104a or the client 104b (via the bus 108a or the bus 108b, respectively), the data remains in that client's write buffer until the client is able to gain control of the bus 102 to access the shared resource 100 and write the data thereto. Similarly, when the external system requests that the client 104a or the client 104b read data from the shared resource 100, the external system waits until the client is able to gain control of the bus 102 to access the shared resource 100 and read the data therefrom.

If the two clients 104 were permitted to control the bus 102 simultaneously, the signals that would be placed on the bus 102 would run the risk of being in contention. That is, signals having opposite logic states may contend for the same bus lines. This is an undesirable result which can cause data transmission errors and/or damage to circuitry connected to the bus 102.

In the embodiment shown in FIG. 1, to avoid having the clients 104a and 104b place contending signals on the bus 102, the clients 104a and 104b are interconnected as a token ring to ensure that only one of the clients 104a and 104b has control of the bus 102 to access the shared resource 100 at any given time. Specifically, a token_in terminal 110a of the client 104a is electrically connected (via a wire 106b) to a token_out terminal 112b of the client 104b, and a token_in terminal 110b of the client 104b is electrically connected (via a wire 106a) to a token_out terminal 112a of the client 104a. Using these token ring connections, a virtual token is passed between the clients 104a and 104b. Only one of the clients 104a and 104b is in possession of the token at a given time, and that client is given exclusive control of the bus 102.

This granting of exclusive control of the bus 102 to one of the clients 104a and 104b may be accomplished, for example, by enabling the drivers in the client having possession of the token and disabling the drivers in the other client. Thus, during the time period that each client is in possession of the token, that client may access the shared resource 100 over the bus 102.

When the client 104 in possession of the token has completed its accessing of the shared resource 100, or if the client 104 receives the token at a time when it does not require access to the shared resource 100, it gives up possession of the token by placing an appropriate signal on its token_out terminal 112. After giving up possession of the token, the client 104 monitors its token_in terminal 110 until it receives the token from the token_out terminal 112 of the other client 104. In this manner, the token is passed continuously from one client 104 to the other.

In the system shown in FIG. 1, each of clients 104a and 104b may be programmed with information that enables it, based upon the current logic states of the signals on its token_in and token_out terminals 110 and 112, to identify whether it is in possession of the token at any given time. For example, the client 104a may be programed such that it is in possession of the token only when the signals on its token_in and token-out terminals 112a and 110b are in the same state, and client 104b may be programmed such that it is in possession of the token only when the signals on its token_in and token-out terminals 110b and 112b are in opposite logic states.

Thus, in this example, because the signals on the lines 106a and 106b are either in the same logic state or opposite logic states at all times, only one client will possess the token at all times. The client 104 that is in possession of the token at any given time may transfer it to the other client simply by inverting the logic state (i.e., "toggling") of the signal on its token_out line 112.

When the system shown in FIG. 1 initially receives power, the logic states of the signals on lines 106a and 106b may, for example, both be initialized to be in the logic low state. Because, in this example, the signals on lines 106a and 106b are initially in the same logic state, client 104a has initial possession of the token and may access shared resource 100.

When client 104a is ready to pass the token to client 104b for the first time after power-up, i.e., when client 104a has finished accessing the shared resource 100 or determines that it does not currently require access to the shared resource 100, the client 104a toggles the signal on its output terminal 112a from the logic low state to a logic high state. Because this toggling causes the signals on lines 106a and 106b to be in different logic states, client 104b now is in possession of the token and may access the shared resource 100.

When client 104b is ready to pass the token back to client 104a, it toggles its output terminal 112b from the logic low state to the logic high state, thereby causing the signals on lines 106 to be in the same logic state, so that client 104a again gains possession of the token.

Subsequently, when client 104a is ready to pass the token once again, it will toggle its output terminal 112a from the logic high state to the logic low state, causing the signals on lines 106a and 106b to be in different logic states and thereby passing the token back to client 104b. Finally, when client 104b is again ready to pass the token, it will toggle its output terminal 112b from the logic high state to the logic low state, causing the signals on lines 106a and 106b to be in the same logic state and thereby passing the token back to client 104a. At this point, the signals on lines 106a and 106b are both in the logic low state, as they were when the system initially received power. This process repeats itself indefinitely so that clients 104a and 104b repeatedly pass the token back and forth.

As shown in FIG. 1, shared resource 100 may include a RAM array. This RAM array may be implemented using a static random-access memory (SRAM) array or a dynamic random-access memory (DRAM) array. If a DRAM array is used, each of the rows of the array must be refreshed periodically, e.g., every "64" milliseconds (ms), to retain the data stored therein. For a DRAM array including, for example, "4096" rows, one row must be refreshed approximately every fifteen microseconds ($\mu s$) to ensure that each row in the array is refreshed every 64 ms (i.e., 64 ms/4096 rows≈15 $\mu s$/row).

If a DRAM array is used in the system shown in FIG. 1, clients 104a and 104b can share the responsibility for performing this row-refreshing function. To this end, each of clients 104a and 104b can include a counter (not shown) which keeps track of the elapsed time between consecutive row-refreshing operations. If, upon receiving the token (as described above), the counter in one of clients 104a and 104b indicates that more than a particular amount of time has elapsed (e.g., 15 $\mu s$) between consecutive row-refreshing operations, that client can perform the refreshing function and the counters in both of clients 104a and 104b can be reset. The shared resource 100 can include circuitry for keeping track of the order in which rows are refreshed so that clients 104a and 104b can simply perform refresh operations (when required) without needing to know which particular row of the shared resource 100 is being refreshed by each operation.

While the prior art system shown in FIG. 1 is reliable under most circumstances, Applicants have recognized that a circuit error or failure in one of the clients 104a and 104b can, under certain circumstances, adversely affect the functionality of the token-passing scheme, thereby leading to the inability of both of the clients 104a and 104b to access the shared resource 100. For example, Applicants have recognized that a circuit anomaly within the client 104a may cause it erroneously to perceive that it is the client 104b, or vice versa. This error can lead to the failure of the token-passing scheme since its occurrence will cause the clients 104a and 104b to perceive either: (1) that they are both in possession of the token, or (2) that they are both not in possession of the token.

For example, if the client 104a erroneously perceives that it is the client 104b, then when the signals on lines 106a and 106b are in the same logic state, both clients will believe that they are not in possession of the token, and when the signals on lines 106a and 106b are in different logic states, both clients will believe that they are in possession of the token. Similarly, if client 104b erroneously believes that it is client 104a, then when the signals on lines 106a and 106b are in the same logic state, both clients will believe that they are in possession of the token, and when the signals on lines 106a and 106b are in the different logic states, both clients will believe that they are not in possession of the token.

Any of these situations can cause problems with the token-passing scheme used in FIG. 1. That is, if both clients have possession of the token, then signals placed on the shared bus 102 by the clients 104 can be in contention with one another. And, if neither client has possession of the token, then each client will wait idly for a state change on its token_in terminal 110, and neither client will be able to access shared resource 100. This second condition can be particularly problematic if the resource being shared by clients 104a and 104b is a dynamic random-access memory (DRAM). That is, because clients 104a and 104b generally share the responsibility of refreshing the DRAM, if neither of them is in possession of the token, then neither of them will refresh the memory and the current contents of the DRAM can be lost.

Figure 2:
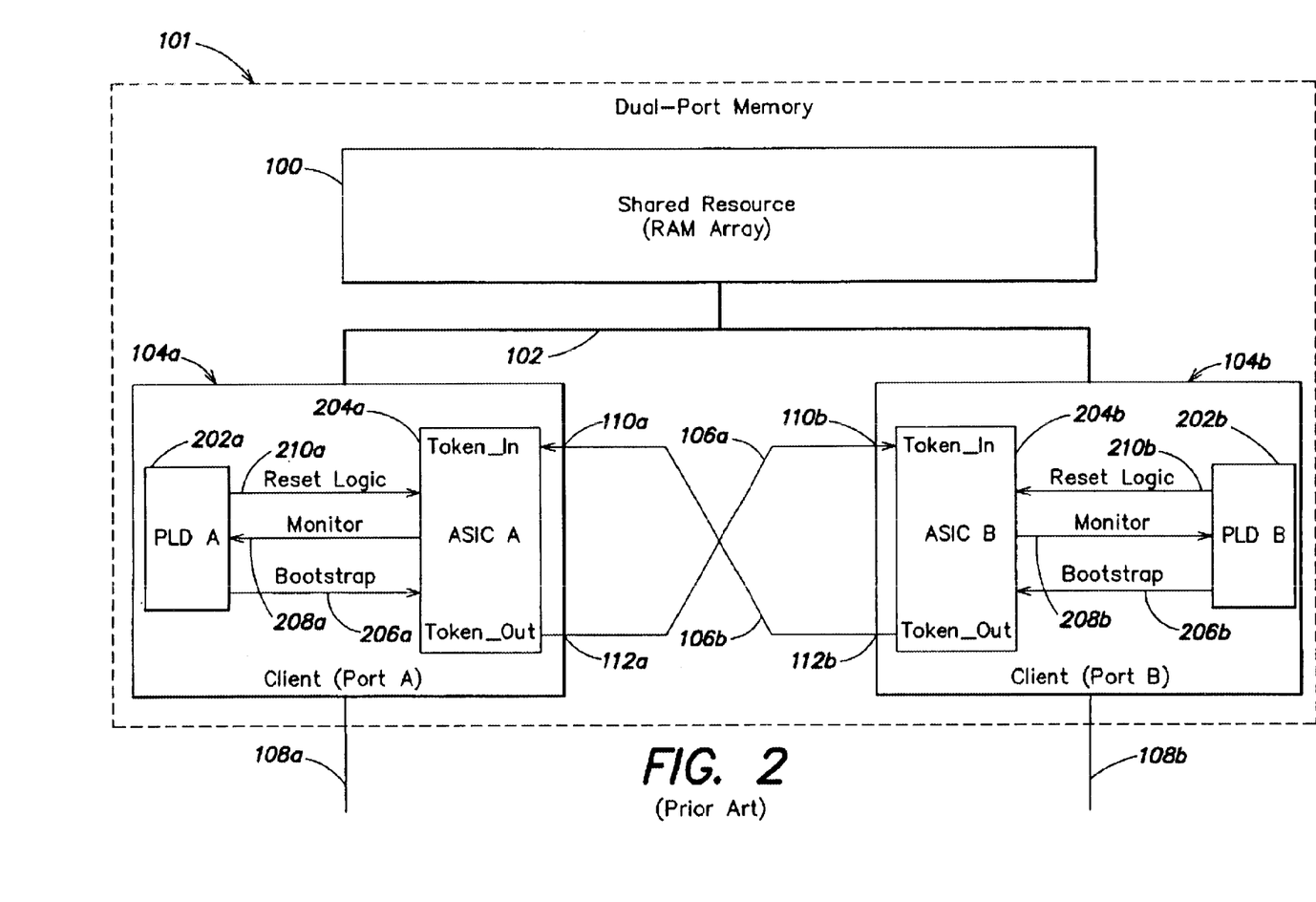
FIG. 2 is a more detailed block diagram showing the prior art shared-resource system of FIG. 1.

FIG. 2 shows an example of a prior art system in which Applicant has recognized that a circuit anomaly might occur that can lead one of the clients 104 to perceive that is the other client. As shown, client 104a includes a programmable logic device (PLD) 202a and an application specific integrated circuit (ASIC) 204a, and client 104b includes a PLD 202b and an ASIC 204b. The ASICs 204a and 204b are configured identically to reduce their development cost as compared with developing two different ASICs. However, the PLDs 202a and 202b, which are less expensive to implement, contain different initialization or bootstrap information for the ASICs 204a and 204b, respectively, and are therefore configured differently. The bootstrap information is used by each ASIC 204 to identify, for example, whether it is included in the client 104a or the client 104b.

As shown, the bootstrap information is provided from the PLDs 202a and 202b to the ASICs 204a and 204b, respectively, via lines 206a and 206b. The bootstrap information is transferred from the PLDs 202 to the ASICs 204 when the system initially receives power. The bootstrap information also is transferred to one of the ASICs 204 each time the PLD 202 associated therewith detects (e.g., via monitoring lines 208) an anomaly in the operation of the ASIC 204 and causes the ASIC 204 to be reset. Such an anomaly may include, for example, a failure of the ASIC 204 to refresh the DRAM array (i.e., shared resource 100) within a particular time period. When such an anomaly is detected by one of the PLDs 202, that PLD 202 provides an active signal on its reset line 210, which is connected between the PLD 202 and the ASIC 204, to reinitialize the ASIC 204. As a part of its reinitialization routine, the ASIC 204 requests the bootstrap information from the PLD 202.

As mentioned above, the bootstrap information transferred to one of ASICs 204 from the PLD 202 associated therewith initializes the ASIC 204 with information that identifies it as being included either in client 104a or client 104b. This bootstrap information identifies, for each client: (1) whether the client 104 is to possess the token when the signals on lines 106a and 106b are in the same logic state or in different logic states, and (2) whether, upon initialization, the client is initially to provide a signal on its token_out terminal 212 that is in a high logic state or a low logic state.

Applicants have recognized that PLDs 202 may occasionally fail such that the bootstrap information that each PLD 202 provides to the ASIC 204 with which it is associated may be inaccurate. Such inaccurate bootstrap information can, for example, cause the ASIC 204 receiving the information to believe that it is the other ASIC 204 in the system. This misidentification of the ASIC 204 can cause the problem discussed above wherein one of the clients can mistakenly perceive that it is the other. Additionally, although the PLDs 202 may be tested for anomalies at the time they are first installed in the system and may be replaced or reprogrammed at that time if they are found to be faulty, the PLDs 202 are also subject to failures after the system has been installed and operating for an extended period of time. Such latent failures of the PLDs 202 can cause serious problems in the system that will persist until service personnel can identify and fix the problem.

In the embodiment shown in FIG. 2, the PLDs 202 monitor the signals on the enable lines of the drivers (not shown) included in the clients 104 to detect occasions when the signals are active concurrently and both of the clients 104 are erroneously given simultaneous access to the shared resource 100. If such a condition is detected, then the PLD 202 associated with one or both of the clients 104 provides an active signal on its reset logic line 210, thereby reinitializing the ASIC 204 so that the ASIC 204 requests and receives the bootstrap information from the PLD 202. If this PLD 202 provides erroneous bootstrap information to the ASIC 204 that causes the ASIC 204 to believe that it is the other ASIC 204, however, this resetting of the ASIC 204 will not remedy the problem, since both ASICs 204 will still perceive that they are included in the same client. This misidentification of the ASICs 204 via the erroneous bootstrap information may eventually result in neither of the ASICs 204 being in possession of the token and in both of the clients 104 waiting idly for it. As described above, this situation can result in system errors and eventually data loss when, for example, a DRAM array is not refreshed by either of the clients 104.

SUMMARY OF THE INVENTION

According to one aspect of the present invention a system for controlling passing of a token among a plurality of clients that access a shared resource includes at least one controller. The at least one controller is configured to cause the token to be passed to each of the plurality of clients when the system is in a first state, and to cause the token to be passed to fewer than all of the plurality of clients when the system is in a second state.

According to another aspect of the invention, a token-ring system includes a shared resource, at least first and second clients that access the shared resource, and error detection logic. The first client includes a primary device and a secondary device which provides bootstrap information to the primary device. The error detection is configured to directly monitor the secondary device for an anomaly in the operation thereof.

According to yet another aspect of the invention, a method is disclosed for controlling passing of a token among clients arranged in a token ring. The method includes the steps of: (a) when the token ring is in a first state, causing the token to be passed to each of the plurality of clients in the token ring, and (b) when the token ring is in a second state, causing the token to be passed to fewer than all of the plurality of clients in the token ring.

According to another aspect of the invention, a method is disclosed for monitoring a system which includes a pair clients and a resource shared therebetween, at least one of the pair of clients including a primary device and a secondary device which provides bootstrap information to the primary device. The method includes a step of directly monitoring the secondary device to detect an anomaly in the operation thereof.

According to another aspect of the invention, a method is disclosed for operating a multi-port memory including at least first and second memory ports that access a shared memory. The first memory port includes a primary device and a secondary device which provides bootstrap information to the primary device. The method includes steps of: (a) permitting each of the first and second memory ports to access the memory when it is in possession of a token, and (b) continuously monitoring the secondary device for an anomaly in operation thereof.

BRIEF DESCRIPTION OF THE DRAWINGS

The present invention should be appreciated from the following detailed description when taken in conjunction with the accompanying drawings, in which like-reference numerals indicate like structures, and in which the left-most one or two numerals of a reference numeral indicate the number of the figure in which the referenced element first appears, and in which.

DETAILED DESCRIPTION OF THE INVENTION

According to one embodiment of the present invention, a controller may be used with a system including two or more clients that access a shared resource to control the exchanging of a token among the clients. The controller may be configured such that, in response to a trigger condition, the controller may cause the token to be passed to fewer than all of the clients in the system. For example, if a problem is detected with a client (e.g., due to a failure of a PLD 202 as described above in connection with FIG. 2), that client can be removed from the token ring. The controller may be used in conjunction with two or more clients of any type that employ a token-passing scheme to access a shared resource. In systems including a large number of clients, a single controller or multiple controllers may be employed. In the example discussed below, the shared resource is a memory array and the clients are ports. However, the invention is not limited to use with any particular type of clients or any particular type of shared resource.

The trigger condition in the system may include any of numerous types of conditions, and the invention is not limited to responding to any particular type of condition. According to one embodiment, for example, the trigger condition may occur when an anomaly is detected in the operation of one of the clients. The controller may cause the token to be passed to fewer than all of the clients in any of numerous ways, and the invention is not limited to any particular manner of achieving this result. According to one embodiment, for example, the controller may cause the token to be passed to all of the clients except for one that is operating anomalously by taking over the token-passing function of the anomalously operating client and preventing the token from being passed thereto.

Figure 3:
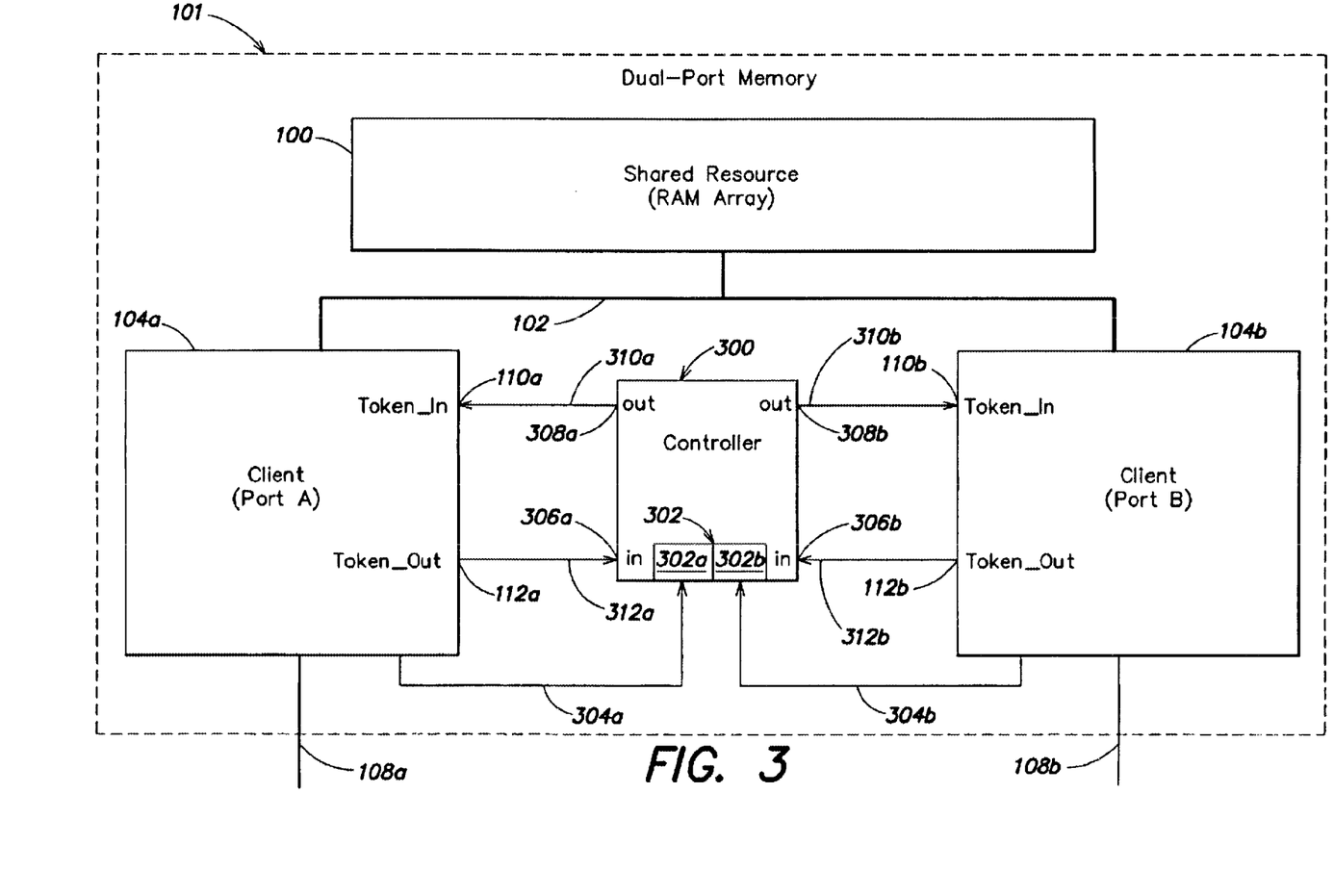
FIG. 3 is a block diagram showing a shared-resource system employing a token-passing scheme according to one embodiment of the invention.
Figure 4:
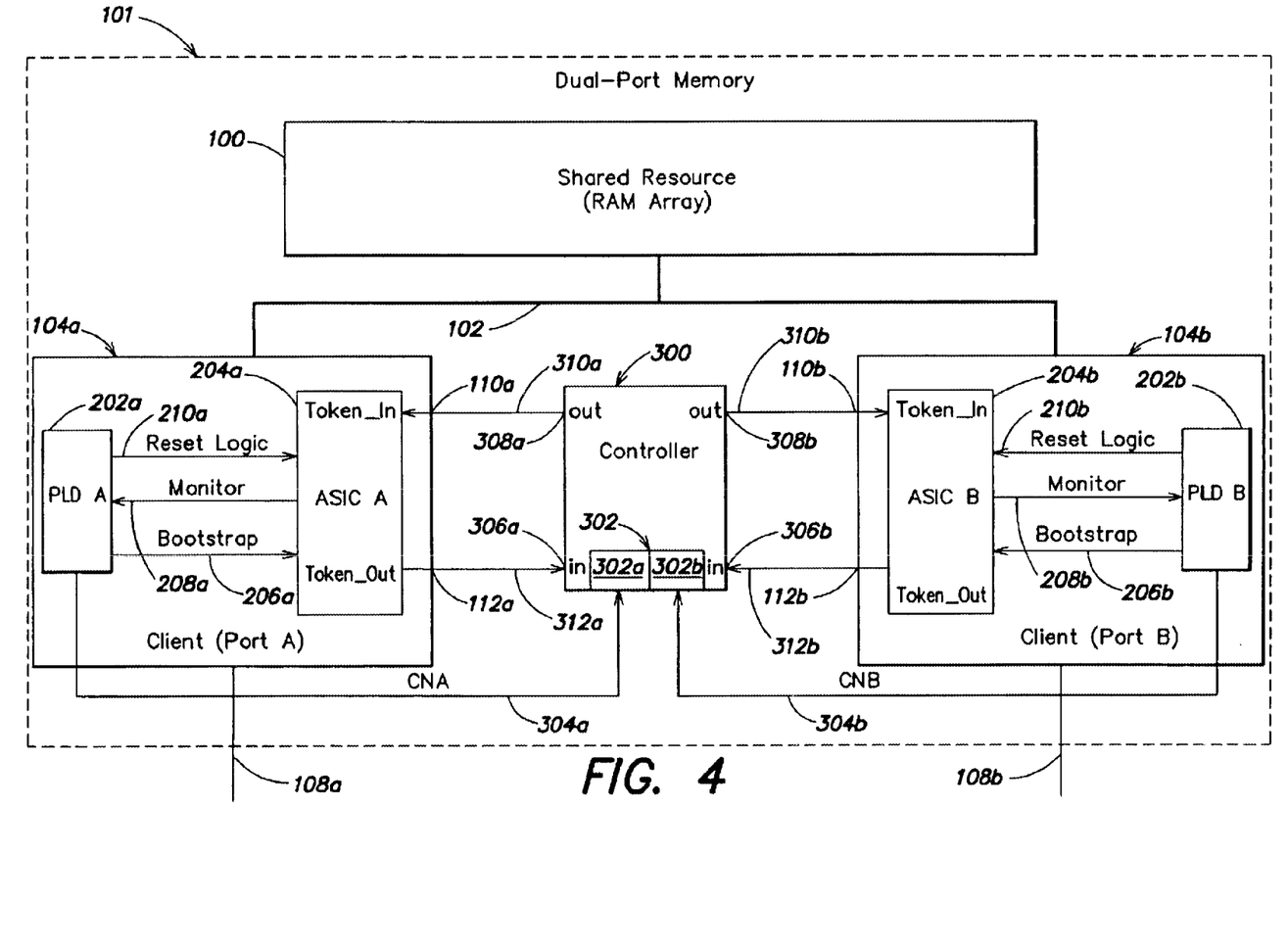
FIG. 4 is a more detailed block diagram showing one illustrative implementation of the shared-resource system of FIG. 3.
Figure 5A:
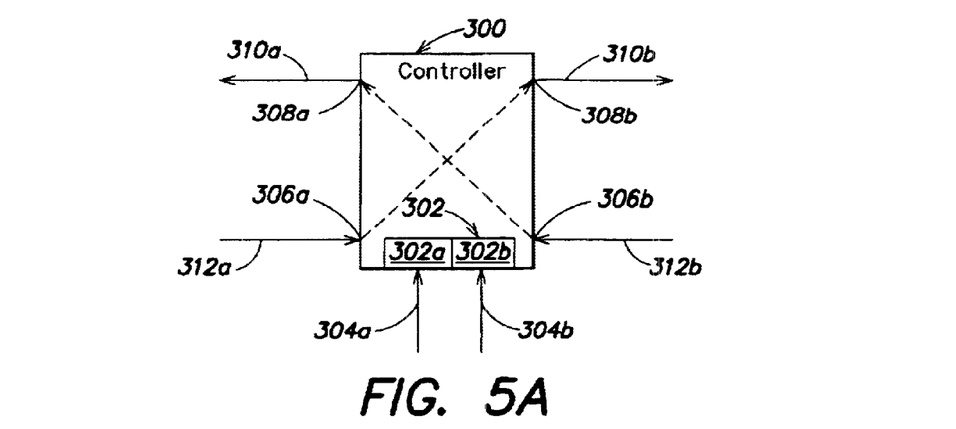
FIGS. 5A–C are diagrams showing how the controller shown in FIGS. 3 and 4 may operate according to one embodiment of the invention.
Figure 5B:
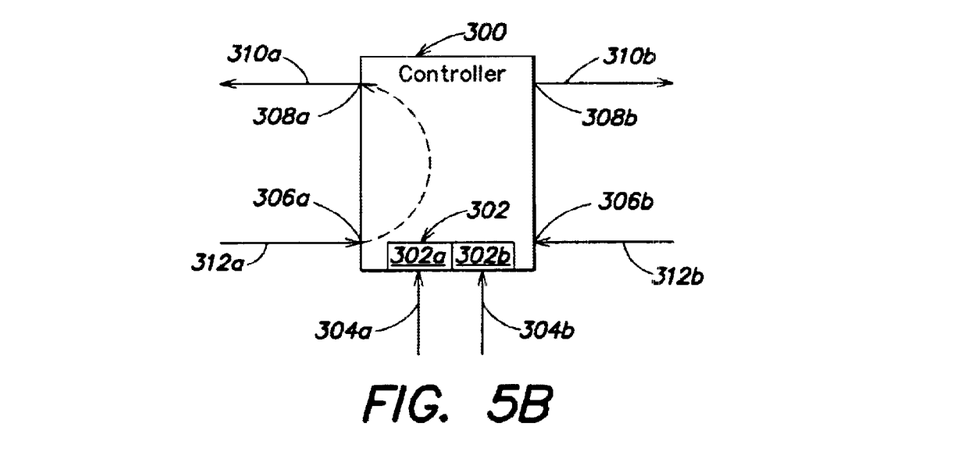
Figure 5C:
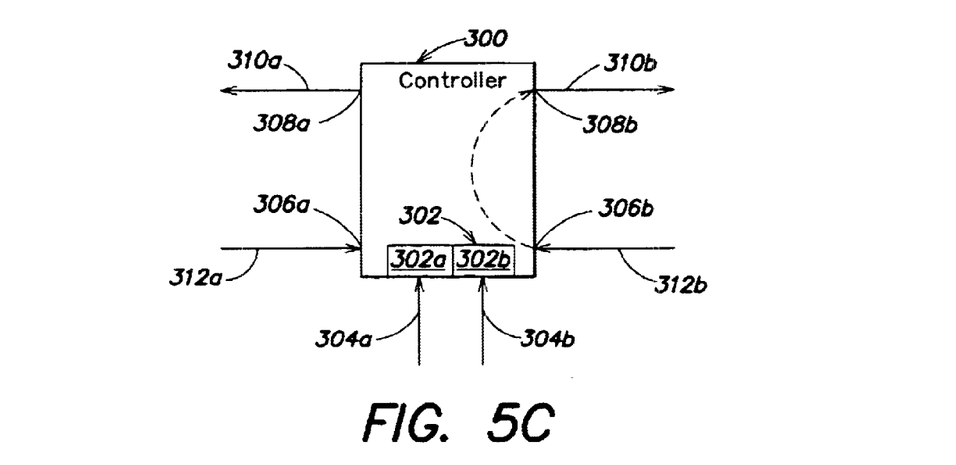

Exemplary systems in which a controller 300 according to one embodiment of the invention may be employed are shown in FIGS. 3 and 4. As shown in these systems, clients 104a and 104b (e.g., Ports A and B) access a shared resource 100 (e.g., a RAM array), and the controller 300 may be coupled to each of the clients 104a and 104b so as to control the exchanging of a token therebetween. The controller 300 may be implemented using any suitable device or circuitry (e.g., a PLD, a programmed processor, dedicated hardware, etc.), and the invention is not limited to any particular implementation. In the systems shown in FIGS. 3 and 4, for example, the controller 300 may be implemented using a PLD. The controller 300 may be configured to operate in any of numerous ways to accomplish its token-controlling function. FIGS. 5A–C illustrate one possible manner in which the controller 300 may be configured to operate.

As shown in FIG. 5A, during normal operation when the trigger condition is not present (e.g., when the clients 104 are functioning properly), the controller 300 may be transparent to the clients 104 and a token may be passed from one client to the other in a manner similar to the system described above in connection with FIGS. 1 and 2. As illustrated in FIGS. 5B–C, however, when a trigger condition is detected (e.g., when an anomaly is detected in the operation of one of the clients 104), the controller 300 may take over the token-passing function of one of the clients (e.g., the anomalously operating client) and prevent the token from being passed thereto. As shown in FIGS. 5B–C, in a two-client ring, this may be accomplished by the controller 300 passing the token directly back to the other client (e.g., the properly operating client) rather than passing it to the client being removed from the ring. In such a situation, because the properly operating client 104 is able to exchange the token with the controller 300, rather than exchanging it with the removed client 104, the controller 300 has taken over the token-passing function of the removed client 104.

One application in which the controller 300 can be employed is to address the problem discussed above in connection with the prior art systems of FIGS. 1 and 2 wherein a problem with one of the clients 104a and 104b can result in both clients perceiving that they are the same client and with neither client believing that it is in possession of the token. As mentioned above, when the shared resource 100 is a DRAM array, this can result the DRAM array not being refreshed and in data eventually being lost.

By the controller 300 taking over the token-passing function of an anomalously operating client, neither client will be left waiting to receive the token from the other as a result of the anomalously operating client perceiving that it is the other client. In this manner, serious system errors (such as the loss of the contents of a dynamic random access memory (DRAM)) can be avoided.

According to another embodiment of the present invention, a system may include two or more clients that access a shared resource, with each client including a primary device and a secondary device. The primary devices may control the passing of a token between the clients, and the secondary devices may, when required, provide bootstrap information to the primary devices. As with the embodiment described above, the shared resource may include any of numerous resources that are shared between two or more clients, and the invention is not limited to any particular type of resource. In the embodiment shown in FIG. 4, for example, the shared resource 100 may be a RAM array, and the pair of clients 104a and 104b that access the shared resource 100 may be memory access ports. The primary and secondary devices may be implemented using any of numerous types of components and the invention is not limited to the use of any particular type. In the embodiment shown in FIG. 4, for example, the primary devices 204 may include application specific integrated circuits (ASICs), and the secondary devices 202a and 202b may include programmable logic devices (PLDs).

According to one embodiment of the invention, the secondary devices may be monitored directly to detect anomalies in the operation thereof and, in response to the detection of any such anomalies, corrective action can be taken. For example, the detection of an anomaly in the operation of a secondary device can serve as the trigger condition described above that can cause the controller 300 to deny the anomalously operating client access to the shared resource. While, in prior art systems, an anomalously operating secondary device may have caused an error detectable at the system level, e.g., the loss of data in a DRAM array, such systems were unable to identify whether it was a particular secondary device or another component in the system that caused the system-level error. By monitoring the secondary devices directly, this embodiment of the invention can identify a particular secondary device as the source of a potential problem. In addition, in one embodiment of the invention, an anomaly can be detected and specific corrective action can be taken in time to avoid the system-level problems (e.g., the loss of data in a DRAM array) that might be caused by the anomalously operating secondary device.

It should be appreciated that the manufacturing of prior art systems such as those shown in FIGS. 1 and 2 involved system-level testing that would detect problems with one of the secondary devices (e.g., PLDs 202a and 202b) prior to shipping of the system to a customer. However, if the secondary devices initially operated correctly and later developed problems while running at a customer site, the prior art systems of FIGS. 1 and 2 provided no facility for directly monitoring the operation of the secondary devices to avoid a potential system failure (e.g., the loss of data from a DRAM array) that could result from problems with the secondary devices. Thus, in contrast to prior art systems that (indirectly) tested the functional operation of the secondary devices in a test environment, one embodiment of the present invention tests the operation of these devices while the system is in normal operating mode (as opposed to a test mode) and running customer applications. Furthermore, in addition to performing a one-time initial test in a manufacturing/test environment, one embodiment of the present invention continuously and repeatedly monitors the secondary devices to ensure that they are operating properly.

According to one embodiment, the system may include error detection logic that directly monitors the secondary devices to identify anomalies in the operation thereof. This error detection logic may comprise any suitable components or circuitry (e.g., discrete logic components, a PLD, an ASIC, or a programmed processor) and may be located anywhere in relation to the other components of the system; the invention is not limited to any particular implementation. In the embodiment shown in FIG. 4, for example, the error detection logic 302 is programmed into the same PLD that constitutes the controller 300 described above. It should be appreciated, however, that the error detection logic 302 and the controller 300 can be implemented in different devices.

The error detection logic 302 may directly monitor the secondary devices 202 for malfunctions and permit corrective action to be taken in response to the detection of any such malfunctions, whereas, in the prior art system shown in FIG. 2, the operation of the secondary devices 202 is not directly monitored, and the undetected malfunctions in such devices can cause serious system failures, as explained above.

It should be understood that the aspect of the invention relating to the direct detection of errors in the operation of the secondary devices may be used separately from the aspect relating to the controlling of token-passing among clients, and that these two aspects of the invention need not be employed together. For example, the error detection logic 302 may simply communicate to the system that when one of the secondary devices 202 is operating improperly, and the system may respond in other ways than by having a controller 300 deny the improperly operating client access to the shared resource 100. Similarly, as noted above, the controller 300 may cause the token to be passed to fewer than all of the clients 104 in response to any trigger condition in the system, and is not limited to responding to the detection of an improperly operating secondary device 202.

FIGS. 3–5 show an exemplary embodiment of a system in which both the token exchanging aspect of the invention and the error detection aspect can be employed together. As shown, the system may include two or more clients 104, the shared resource 100, and the controller 300. The clients 104 are able to access the shared resource 100 when they are in possession of a token that is passed between them. The shared resource 100 may be any resource that is accessed by more than one client, and clients 104 may be any devices that are capable of accessing the shared resource 100. In the embodiment shown, shared resource 100 includes a random access memory (RAM) array (which may include dynamic RAMs (DRAMs) or static RAMs (SRAMs)), and clients 104 include ports for accessing this RAM array. However, the invention is not limited to this particular application and may alternatively be used in other applications in which a different type of resource is shared between two or more clients.

The general operation of clients 104a and 104b and their functionality with regard to token-passing can be substantially identical to that described above in connection with FIGS. 1 and 2. It should be appreciated, however, that the token-passing scheme described above is only one example of a token-passing scheme with which the present invention may be employed, and that the invention is not limited to this or any other particular token-passing scheme. For example, each token may include several bits of information that may be transmitted in serial or in parallel, rather than the single bit described above, and the token may be passed between three or more clients, rather than only between the two clients illustrated in the figures. It should also be appreciated that the invention is not limited to clients implemented using ASICs and PLDs, and may alternatively be employed in systems wherein the clients are implemented using other types of components.

As shown in FIGS. 3 and 4, the controller 300 may be connected to each of the clients 104a and 104b so as to control the passing of a token therebetween. It should understood that the particular connections shown are made only to accommodate the particular token-passing scheme used by the system, and that other connections may be made in connection with alternative embodiments of the invention for use in systems employing different token-passing schemes. In the example shown, token_out terminals 112a and 112b may be connected, respectively, to exchange_in terminals 306a and 306b of controller 300 (via lines 312a and 312b), and token_in terminals 110a and 110b may be connected, respectively, to exchange_out terminals 308a and 308b of controller 300 (via lines 310a and 310b). As illustrated in FIG. 4, the token_in terminals 110 and the token_out terminals 112 may be connected to the ASICs 204 (when an embodiment of the invention that uses ASICs is employed).

According to one embodiment, the error detection logic 302 may be used to monitor the condition of the clients 104a and 104b. The error detection logic 302 may be located anywhere in relation to the other components in the system and may be used to monitor any condition(s) of any component(s) of the clients 104 in any suitable manner; the invention is not limited to the monitoring of any particular condition or any particular component. One example of how the error detection logic 302 may be used to monitor the operation of particular components of the clients 104 is shown in FIG. 4. In the exemplary embodiment shown, the error detection logic 302 may be included in the controller 300 and may be used to directly monitor the current condition of the PLDs 202a and 202b via the monitoring lines 304a and 304b, respectively.

The monitoring lines 304 may be implemented in any fashion, and the invention is not limited to any particular implementation. According to one embodiment, each of the monitoring lines 304 may include a single line on which a serial stream of data (e.g., sixteen bits) may be transmitted from one of the clients 104 to the error detection logic 302. In the exemplary embodiment shown in FIG. 4, the sixteen bits of data on the lines 304a and 304b may be generated, respectively, by the PLDs 202a and 202b. Specifically, the PLD 202a may generate a first sixteen-bit characteristic number (CNA) and provide this number serially on the line 304a, and the PLD 202b may generate a second sixteen-bit characteristic number (CNB) and provide this number serially on the line 304b. Any numbers may be used as these characteristic numbers, and the invention is not limited to the use of any particular number. According to one embodiment, each characteristic number constitutes a sequence of fifteen zeros followed by a one, and this sequence of sixteen bits is repeated continuously.

As shown in FIG. 4, the lines 304a and 304b may be connected, respectively, to sections 302a and 302b of the error detection logic 302. The sections 302a and 302b may be configured to identify anomalies in the characteristic numbers generated, respectively, by the PLDs 202a and 202b. Any suitable timing and synchronization scheme may be used to keep the error detection logic 302 and the PLDs 202 in synchronization with one another. For example, the PLDs 202 and the error detection logic 302 may be driven by a common clock, and a special code (which is readily synchronized) may be employed as each of the characteristic numbers. The fifteen zeros followed by the one described above is an example of such a code.

It should be appreciated that in the embodiment of FIG. 4, the error detection logic 302 assumes that if it detects any anomaly in one of the characteristic numbers from the PLDs 202, then the PLD 202 that generated the anomalous number has failed or is failing, and that the bootstrap information provided therefrom cannot be trusted. Based upon this assumption, error detection logic 302 may monitor the overall operational integrity of each PLD simply by monitoring a signal generated by a small portion thereof for anomalies. It should be appreciated that this feature of monitoring a signal generated by one portion of a circuit in order to evaluate the operational integrity of another portion of the circuit may be used in connection with any of numerous types of circuits and is not limited to use with a PLD.

As discussed above, in one embodiment of the present invention, the sequence that defines the characteristic number from each secondary device is repeated continuously and is monitored continuously to detect any anomalies therein. This is advantageous because any malfunction of the secondary device can be detected immediately, so that corrective action can be taken before a potentially irrecoverable system failure (e.g., a loss of data from a DRAM array) can occur. It should be appreciated that, as used herein, the reference to continuous monitoring requires only that the secondary device be monitored at sufficiently small time intervals to enable corrective action to be taken before a potentially irrecoverable system failure results.

According to one embodiment of the invention, in response to detecting an anomalous characteristic number from one of the PLDs 202, the error detection logic 302 may cause the controller 300 to take over the token-passing function of the client that includes the PLD 202 that generated the anomalous number. The controller 300 therefore may repeatedly route the token directly back to the other client so that the client that includes the failed or failing PLD 202 will not obtain possession of the token. This feature is advantageous because it overcomes the problems discussed above that can result from an ASIC receiving erroneous bootstrap data from a failed or failing PLD. It should be appreciated, however, that a failing or failed PLD 202 is only one example of an anomaly that may occur within one of the clients 104 and gives rise to the controller 300 taking over the token-passing function of the failed client. As mentioned above, the aspect of the invention related to the controller impacting the token-passing is not limited to use in a system wherein it is triggered in response to the detection of anomalies in the operation of the PLDs 202.

The controller 300 may take over the token-passing function of the failed or failing client in any of numerous ways, and the invention is not limited to any particular technique. The manner in which the controller 300 operates is dictated, at least in part, by the token-passing scheme that is employed to pass a token between the clients 104a and 104b. In the exemplary embodiment shown in FIGS. 3–5, the controller 300 may be configured to handle any of the following three situations: (1) when the error detection logic 302 does not detect an anomaly in the operation of either of the clients 104, (2) when the error detection logic 302 detects an anomaly in the operation of the client 104b, and (3) when the error detection logic detects an anomaly in the operation of the client 104a. FIGS. 5A–C illustrate, respectively, how the controller 300 may control the passing of the token in each of these three situations.

In the illustrative example discussed below of how the controller 300 can operate to properly route the token in each of the three situations described above, the clients are programmed such that client 104a possesses the token when the signals on the lines 310a and 312a are in the same logic state, and client 104b possesses the token when the signals on the lines 310b and 312b are in different logic states.

As illustrated in FIG. 5A, when the error detection logic 302 does not detect an anomaly in the operation of either of the clients 104a or 104b, then the controller 300 causes the token to be passed from each client's token_out terminal 112 (via lines 312), through the controller 300, to the other client's token_in terminal 110 (via lines 310). In the example shown in the figures, this may be accomplished by: (1) generating a signal on the exchange_out terminal 308b that is in the same logic state as the signal on the exchange_in terminal 306a, and (2) generating a signal on the exchange_out terminal 308a that is in the same logic state as the signal on the exchange in terminal 306b. In this manner, when the error detection logic 302 does not detect an anomaly in the operation of either of the clients 104a or 104b, the controller 300 is effectively transparent to the clients 104.

As illustrated in FIG. 5B, when the error detection logic 302 detects an anomaly in the operation of the client 104b, then the controller 300 may take over the token-passing function of the client 104b and prevent the client 104b from receiving possession of the token. In the example shown in the figures, this may be accomplished by: (1) generating a signal on the exchange_out terminal 308a that is in the same logic state as the signal on the exchange_in terminal 306a, and (2) maintaining the signal on the exchange_out terminal 308b in a constant logic state, regardless of any logic state changes in the signals on the controller's other terminals. By generating a signal on the exchange_out terminal 308a that is in the same logic state as the signal on the exchange_in terminal 306a, the controller 300 can ensure that the token is immediately rerouted back to the client 104a after each time the client 104a gives up the token, rather than passing the token to the client 104b. By maintaining the signal on the exchange_out terminal 308b in a constant logic state, if client 104b has initial possession of the token, it will soon give up and not regain possession of the token, and when the client 104b does not have initial possession of the token, it will not gain possession of it.

As illustrated in FIG. 5C, when the error detection logic 302 detects an anomaly in the operation of the client 104a, then the controller 300 may take over the token-passing function of the client 104a and prevent the client 104a from receiving possession of the token. In the example shown in the figures, this may be accomplished by: (1) generating a signal on the exchange_out terminal 308b that is in the opposite logic state from the signal on the exchange_in terminal 306b, and (2) maintaining the signal on the exchange_out terminal 308a in a constant logic state, regardless of any logic state changes in the signals on the controller's other terminals. By generating a signal on the exchange_out terminal 308b that is in the opposite logic state from the signal on the exchange_in terminal 306b, the controller 300 can ensure that the token is immediately rerouted back to the client 104b after each time the client 104b gives up the token, rather than passing the token to the client 104a. By maintaining the signal on the exchange out terminal 308a in a constant logic state, if client 104a has initial possession of the token, it will soon give up and not regain possession of the token, and when the client 104a does not have initial possession of the token, it will not gain possession of it.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended to be limiting. The invention is limited only as defined in the following claims and the equivalents thereto.

What is claimed is:

1. A system for controlling passing of a token among a plurality of clients that access a shared resource, the system having first and second states, the system comprising:
    at least one controller, to be coupled to at least two of the plurality of clients, configured to cause the token to be passed to each of the plurality of clients when the system is in the first state, and to cause the token to be passed to fewer than all of the plurality of clients when the system is in the second state;
    wherein the at least one controller is configured to take over the token-passing function of at least one of the plurality of clients when the system is in the second state by intercepting the token intended for the at least one of the plurality of clients to prevent the token from being received by the at least one of the plurality of clients and by passing the token to another of the plurality of clients.

2. The system as claimed in claim 1, further comprising:
    error detection logic configured to monitor at least one of the plurality of clients for an anomaly in the operation thereof, the at least one controller being responsive to detection of an anomalously operating client to recognize the system as being in the second state.

3. The system as claimed in claim 2, wherein the error detection logic and the at least one controller are implemented on a single device.

4. The system as claimed in claim 1, wherein the system is in the second state when one of the plurality of clients is operating anomalously, and wherein the at least one controller is configured to prevent the token from being passed to the one of the plurality of clients that is operating anomalously.

5. The system as claimed in claim 1, wherein the system is in the second state when one of the plurality of clients is operating anomalously, and wherein the at least one controller is configured to take over the token-passing function of the one of the plurality of clients that is operating anomalously.

6. The system as claimed in claim 1, wherein the shared resource includes a memory and each of the plurality of clients includes a memory port.

7. The system as claimed in claim 6, in combination with the memory and the memory ports.

8. The combination as claimed in claim 7, wherein the memory includes a dynamic random access memory.

9. The system as claimed in claim 1, wherein the at least one controller includes a programmed programmable logic device.

10. The system as claimed in claim 1, wherein the at least one controller is configured to cause the token to be passed to at least one of the plurality of clients when the system is in the second state.

11. The system as claimed in claim 1, wherein the at least one controller includes:
    means for causing the token to be passed to each of the plurality of clients when the system is in the first state, and
    means for causing the token to be passed to fewer than all of the plurality of clients when the system is in the second state.

12. A system for controlling passing of a token among a plurality of clients that access a shared resource, the system having first and second states, the system comprising:
    at least one controller, to be coupled to at least two of the plurality of clients, configured to cause the token to be passed to each of the plurality of clients when the system is in the first state, and to cause the token to be passed to fewer than all of the plurality of clients when the system is in the second state; and
    error detection logic configured to monitor at least one of the plurality of clients for an anomaly in the operation thereof, the at least one controller being responsive to detection of an anomalously operating client to recognize the system as being in the second state;
    wherein the at least one controller is configured to take over the token-passing function of at least one of the plurality of clients when the system is in the second state; and wherein at least one of the at least two of the plurality of clients includes a primary device and a secondary device which provides bootstrap information to the primary device, and wherein the error detection logic is configured to directly monitor the secondary device for an anomaly in the operation thereof.

13. The system as claimed in claim 12, wherein the error detection logic is configured to directly monitor the secondary device for an anomaly in the operation thereof by monitoring a signal pattern generated by the secondary device to identify a deviation from a signal pattern that is expected to be generated thereby.

14. The system as claimed in claim 13, wherein the signal pattern is separate from the bootstrap information.

15. The system as claimed in claim 13, wherein the signal pattern is transmitted serially.

16. The system as claimed in claim 13, wherein in the signal pattern includes a predetermined pattern of binary values that is repeated continuously.

17. A token-ring system, comprising:
    a shared resource;
    at least first and second clients that access the shared resource, each of the at least first and second clients including a primary device and a secondary device which provides bootstrap information to the primary device, and
    error detection logic, coupled to each of the secondary devices, configured to directly monitor each of the secondary devices for an anomaly in the operation thereof that results in an anomaly in the bootstrap information provided thereby, and to identify which, if any, of the secondary devices is operating anomalously.

18. The token-ring system as claimed in claim 17, wherein the secondary device includes a programmable logic device.

19. The token-ring system as claimed in claim 18, wherein the primary device includes an application specific integrated circuit.

20. The token-ring system as claimed in claim 17, wherein:
    each of the at least first and second clients includes a primary device and a secondary device;
    the primary devices are identical ASICs; and
    the secondary devices are configured differently than one another.

21. The token-ring system as claimed in claim 17, wherein the shared resource includes a memory and each of the at least first and second clients includes a memory port.

22. The token-ring system as claimed in claim 21, wherein the memory includes a dynamic random access memory.

23. The token-ring system as claimed in claim 17, wherein the error detection logic directly monitors the secondary device for the anomaly in the operation thereof by monitoring a signal pattern generated by the secondary device to identify a deviation from a signal pattern that is expected to be generated thereby.

24. The token-ring system as claimed in claim 23, wherein the signal pattern is separate from the bootstrap information.

25. The token-ring system as claimed in claim 23, wherein the signal pattern is transmitted serially.

26. The token-ring system as claimed in claim 23, wherein the signal pattern includes a predetermined pattern of binary values that is repeated continuously.

27. The token-ring system as claimed in claim 17, wherein the error detection logic is configured to directly monitor the secondary device at least occasionally during all times when the system is in operation.

28. The token-ring system as claimed in claim 17, wherein the error detection logic is configured to directly monitor the secondary device continuously during all times when the system is in operation.

29. The token-ring system of claim 17, wherein the at least first and second clients each is capable of accessing the shared resource only when in possession of a token.

30. The token-ring system of claim 29, wherein the primary device is configured to receive and relinquish the token.

31. The token-ring of claim 30, wherein the bootstrap information provides information designating when the token has been received by the primary device.

32. The token-ring of claim 30, wherein the primary device has a plurality of logic states, and wherein the token corresponds to a first of the plurality of logic states such that the first client is in possession of the token when the primary device is in the first of the logic states and the first client is not in possession of the token when the primary device is not in the first of the plurality of logic states.

33. The token-ring of claim 32, wherein the bootstrap information specifies which of the plurality of logic states the primary device is in.

34. A method for controlling passing of a token among clients arranged in a token ring, the token ring having at least first and second states, the method comprising steps of:
(a) when the token ring is in the first state, causing the token to be passed to each of the plurality of clients in the token ring; and
(b) when the token ring is in the second state, causing the token to be passed to fewer than all of the plurality of clients in the token ring, and having another component take over the token-passing function of at least one of the plurality of clients by intercepting the token intended for the at least one of the plurality of clients to prevent the token from being received by the at least one of the plurality of clients and by passing the token to another of the plurality of clients.

35. The method as claimed in claim 34, wherein the step (b) includes a step of causing the token to be passed to at least one of the plurality of clients in the token ring when the token ring is in the second state.

36. The method as claimed in claim 34, further comprising steps of:
(c) detecting an anomaly in the operation of at least one of the plurality of clients; and
(d) placing the token ring in the first state when no anomalously operating clients are detected and in the second state when an anomalously operating client is detected.

37. The method as claimed in claim 36, wherein the step (b) includes a step of taking over the token-passing function of a client that is operating anomalously.

38. The method as claimed in claim 36, wherein the step (b) includes a step of preventing the token from being passed to at least one anomalously operating client.

39. The method as claimed in claim 34, wherein the shared resource includes a memory and each of the plurality of clients includes a memory port, and wherein the method further includes a step of permitting each memory port to access the memory when it is in possession of the token.

40. The method as claimed in claim 39, wherein the memory includes a dynamic random access memory, and wherein the step of permitting each memory port to access the memory when it is in possession of the token includes a step of permitting each memory port to access the dynamic random access memory when it is in possession of the token.

41. A method for controlling passing of a token among clients arranged in a token ring, the token ring having at least first and second states, the method comprising steps of:
(a) when the token ring is in the first state, causing the token to be passed to each of the plurality of clients in the token ring; and
(b) when the token ring is in the second state, causing the token to be passed to fewer than all of the plurality of clients in the token ring, and having another component take over the token-passing function of at least one of the plurality of clients;
(c) detecting an anomaly in the operation of at least one of the plurality of clients; and
(d) placing the token ring in the first state when no anomalously operating clients are detected and in the second state when an anomalously operating client is detected;
wherein at least one of the pair of clients includes a primary device and a secondary device which provides bootstrap information to the primary device, and wherein the step (c) includes a step of directly monitoring the secondary device for an anomaly in the operation thereof to detect the anomaly in the operation of the at least one of the plurality of clients.

42. The method as claimed in claim 41, wherein the step (b) includes a step of:
when the secondary device is identified as operating anomalously, preventing the token from being passed to the client that includes the secondary device, thereby denying the client that includes the secondary device access to the shared resource.

43. The method as claimed in claim 41, wherein the step (b) includes a step of:
when the secondary device is identified as operating anomalously, taking over a token-passing function of the client that includes the secondary device.

44. A method for monitoring a system which includes a pair of clients and a resource shared therebetween, each of the pair of clients including a primary device and a secondary device which provides bootstrap information to the primary device, the method comprising a step of:
(a) directly monitoring each of the secondary devices with error detection logic to detect an anomaly in the operation thereof that results in an anomaly in the bootstrap information provided thereby, and to identify which, if any, of the secondary devices is operating anomalously.

45. The method as claimed in claim 44, wherein the secondary device includes a programmable logic device, and wherein the step (a) includes a step of directly monitoring the programmable logic device to detect the anomaly in the operation thereof.

46. The method as claimed in claim 44, wherein the primary device includes an application specific integrated circuit, and wherein the method further comprises a step of providing the bootstrap information from the secondary device to the application specific integrated circuit.

47. The method as claimed in claim 44, wherein the resource includes a memory and each of the pair of clients includes a memory port, and wherein the method further includes a step of permitting each memory port to access the memory when it is in possession of a token.

48. The method as claimed in claim 47, wherein the memory includes a dynamic random access memory, and wherein the step of permitting each memory port to access the memory when it is in possession of the token includes a step of permitting each memory port to access the dynamic random access memory when it is in possession of the token.

49. The method as claimed in claim 44, wherein the step (a) includes a step of monitoring a signal pattern generated by the secondary device to identify a deviation from a signal pattern that is expected to be generated thereby.

50. The method as claimed in claim 49, wherein the step of monitoring the signal pattern generated by the secondary device includes a step of monitoring a serial signal pattern generated by the secondary device.

51. The method as claimed in claim 44, wherein the step (a) includes a step of directly monitoring the secondary device at least occasionally during all times when the system is in operation.

52. A method for operating a multi-port memory having a plurality of memory ports including at least first and second memory ports that access a shared memory, the first memory port including a primary device and a secondary device which provides bootstrap information to the primary device, the method comprising steps of:

(a) permitting each of the first and second memory ports to access the memory when it is in possession of a token;

(b) continuously monitoring the secondary device for an anomaly in operation thereof that results in an anomaly in the bootstrap information provided thereby;

(c) when the secondary device is not operating anomalously, causing the token to be passed to each of the first and second memory ports; and (d) when the secondary device is operating anomalously, preventing the token from being passed to the first memory port by having another component take over the token-passing function of the first memory port by intercepting the token intended for the first memory port to prevent the token from being received by the first memory port and by passing the token to another of the plurality of memory ports.

53. The method as claimed in claim 52, wherein the step (d) includes a step of:

when the secondary device is operating anomalously, causing the token to be passed to each of the plurality of memory ports except for the first memory port.

54. The method as claimed in claim 52, wherein the step (b) includes a step of directly monitoring the secondary device for the anomaly in the operation thereof.

55. The method as claimed in claim 52, wherein the system may operate in a customer environment and a test environment, and wherein step (b) includes a step of continuously monitoring the secondary device for the anomaly in the operation thereof when the system is operating in the customer environment.

* * * * *